T. A. McDONALD.
MANURE SPREADER.
No. 179,805. Patented July 11, 1876.
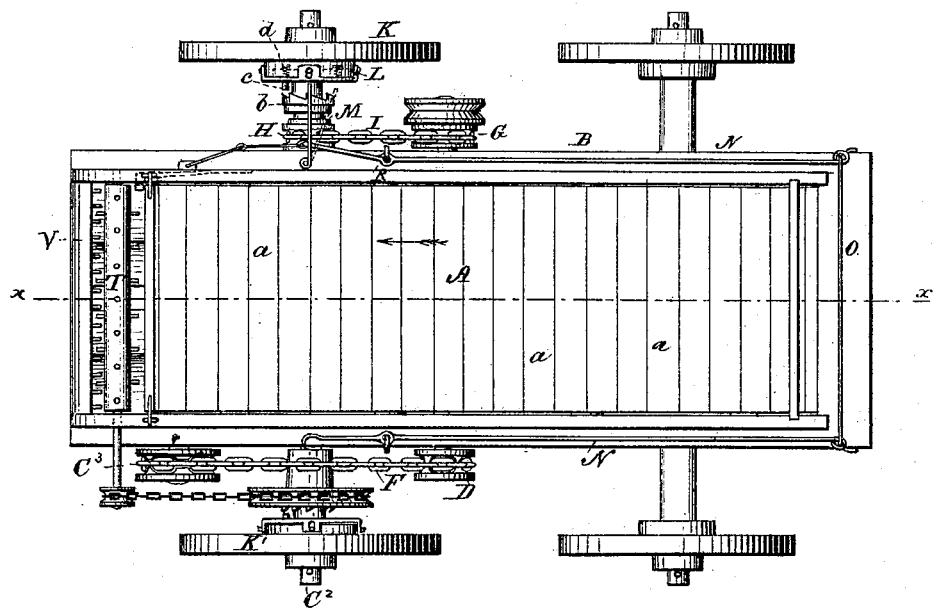
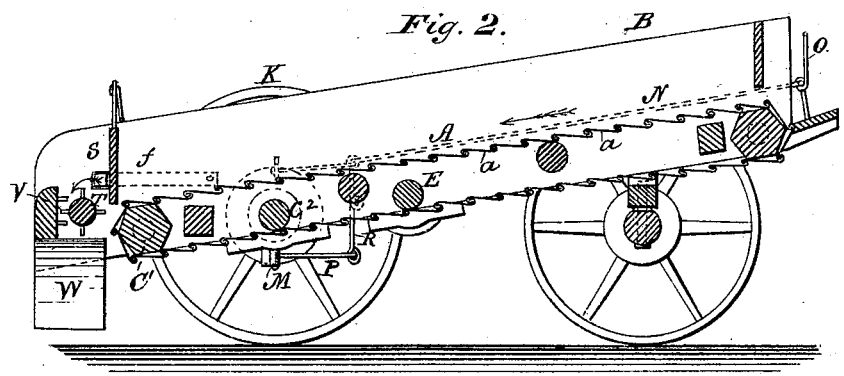
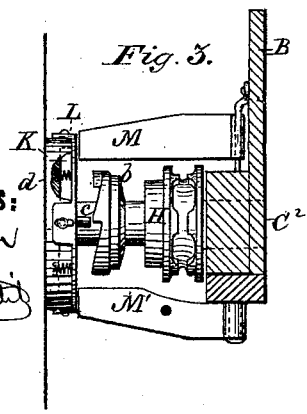
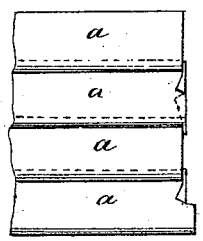
WITNESSES:
INVENTOR:
Thomas A. McDonald
BY
ATTORNEYS.

UNITED STATES PATENT OFFICE.

THOMAS A. McDONALD, OF DURHAM, NOVA SCOTIA, CANADA.

IMPROVEMENT IN MANURE-SPREADERS.

Specification forming part of Letters Patent No. 179,805, dated July 11, 1876; application filed April 26, 1876.

*To all whom it may concern:*

Be it known that I, THOMAS A. MCDONALD, of Durham, Province of Nova Scotia, Dominion of Canada, have invented a new and Improved Self-Discharging Manure-Spreader; and I do hereby declare that the following is a full, clear, and exact description of the same.

The invention relates to a wagon for transporting manure and spreading it broadcast or in drills.

The bottom of the wagon-body is in the nature of an endless traveling belt or apron, supported upon polygonal shafts, one of which is geared with and derives motion from the rear axle. The latter is provided with a spring-clutch mechanism, by which it may be thrown into and out of gear with the endless apron at the will of the driver, in order to thus regulate the discharge of the manure. The means immediately employed to throw the clutch out of engagement are pivoted levers, operated by connecting-rods, and a lever under the control of the driver. The endless apron is composed of narrow metal plates or strips jointed together, and prevented from disconnection and displacement by turning up the ends of each alternate strip to cover the ends of the joints.

In the accompanying drawing, forming part of this specification, Figure 1 is a top plan view, and Fig. 2, a sectional elevation of the manure-spreader. Figs. 3 and 4 are detail views.

The bottom A of the wagon-body B is in the form of an endless belt or apron, and is supported upon hexagonal shafts or rollers C C$^1$, which are located at or near the respective front and rear ends of the body B. The front bolster is cut away on the upper side to accommodate the apron. The latter, A, is composed of narrow strips $a$ of galvanized sheet or plate iron, which are connected by a hook-joint formed by turning and interlocking their edges, as shown, Fig. 4. To prevent them sliding one on the other, each alternate strip $a$ is made longer than the one which is contiguous, and the ends of said strip are turned over to cover the end of the joint. Motion is communicated to the endless apron A by contact of the lengthwise ribs or projections of the roller C$^1$ with the joints of the same. The said roller is geared with the rear axle C$^2$ by the following means: A chain-pulley, C$^3$, is attached to the projecting end of the roller, and a similar pulley, D, is mounted fast on the end of a shaft, E, which is located midway of the wagon-body, and arranged transversely thereof between the two sides of the traveling-apron A. A chain, F, connects these two pulleys. The other end of shaft E carries a chain-pulley, G, and a similar one, H, is mounted on the contiguous portion of the axle C$^2$. A chain, I, connects these. Thus the rotation of the axle is communicated first to the intermediate shaft E, next to the roller C$^1$, and thence to the endless apron A. Provision is made for changing the speed and thus varying the rapidity of discharge of the manure from the apron A by means of differential pulleys on the shaft E. (See Fig. 1.)

The wheels K K' are loose on the rear axle, and are geared therewith so that both (wheels and axle) will rotate together by means of ratchet-collars $b$ on the axle, and plates L, which are attached to the inner ends of the wheel-hubs. The direct connection between said collar and plates is a tooth or projection, $c$, on the latter. The tooth will engage the teeth of the collars $b$ when the wheels rotate forward, but will ride over the teeth when the wheels rotate backward. Hence, when the wagon is drawn forward, the clutch locks, the axle rotates, also the shaft E and roller C$^1$, and thus the endless apron A is caused to travel in the direction indicated by the arrow, and thereby discharge the manure at the rear end of the wagon.

When the wagon is running upon a curve, but one of the clutches will be engaged; thus the apron will be caused to travel and discharge the manure whether the wagon turns to the right or left hand.

It is obviously necessary that the clutch should be adapted to be thrown into and out of gear at the will of the driver, so that the discharge of the manure may be regulated in like manner. For this purpose the clutch-plates L are adapted to yield and be taken out of engagement with collars $b$ by the provision of springs $d$, placed in cavities in the hubs beneath the plates. To force the plates back out of engagement, I employ levers M M', one hinged to the side of the wagon-body, and the other below the axle.

When the clutch is engaged these levers are turned to one side, but they are brought into operation and caused to press back the plates L by being swung around parallel to the axle or at right angles to the side of the wagon-body, as shown in Figs. 1 and 3.

The means of operating the levers are connecting-rods N and a foot-lever, O, the latter being pivoted to the foot-board of the wagon, or otherwise suitably arranged to be under the control of the driver. The lower lever M' is operatively connected with the rods N by means of a link, P, and vertical lever R, pivoted centrally to the side of the wagon-body, Figs. 1, 2; the levers M M', therefore, swing in opposite directions. The same devices, to wit, foot-lever O and connecting-rod N, are employed to operate the latch $f$ of the rear end board S simultaneously with the engagement of the clutch. Said end board is pivoted at the top, and thus swings free at the bottom. The spring-latch $f$ works through the side of wagon-body and holds the board S vertical against the pressure of the manure in the wagon-body until released by the driver operating the foot-lever O.

To break up the clods and properly pulverize the manure as it passes off the apron A, I employ a toothed roller, T, and fixed toothed concave V. The roller is rotated in the same direction as the apron by means of cross-chain and pulley connection with the axle $C^2$. The manure is pulverized by the interaction of the roller and concave, and distributed in drills by the inclined guide-plates W, which are detachably secured to the rear end of the wagon-body by means of screws or equivalent devices.

In order to distribute the manure broadcast, it is only necesssary to remove the plates W. As a matter of economy, the fore wheels and axle of an ordinary farm-wagon may be used in connection with the wagon-body B in place of such as are specially constructed for the purpose.

Having thus described my invention, what I claim is—

1. The endless traveling-apron, composed of metal strips or plates connected by hook-joints, and having their ends bent up to prevent displacement and disconnection, as shown and described.

2. The endless apron, composed of jointed plates $a$, the polygonal rollers C $C^1$, intermediate shaft E, axle $C^2$, chains I, chain-pulleys $C^3$ D G H, the axle-wheels, and clutch mechanism, combined as shown and described.

3. The combination of foot-lever O, levers M M', and connecting devices, with the yielding clutch-plate L, as shown and described.

4. The combination of swinging end board S, its latch $f$, the swinging levers M M', and devices for operating them, the clutch mechanism, axle, and traveling-apron, as shown and described.

THOMAS ANTHONY McDONALD.

Witnesses:
AMOS W. HART,
SOLON C. KEMON.